UNITED STATES PATENT OFFICE.

GEORGE T. LEWIS, OF PHILADELPHIA, PENNSYLVANIA.

PROCESS OF MANUFACTURING OXIDE OF ZINC.

SPECIFICATION forming part of Letters Patent No. 501,189, dated July 11, 1893.

Application filed September 1, 1891. Serial No. 404,438. (No specimens.)

*To all whom it may concern:*

Be it known that I, GEORGE T. LEWIS, of the city and county of Philadelphia, State of Pennsylvania, have invented a certain new and useful Improvement in Processes of Manufacturing Oxide of Zinc, of which the following is a true and exact description.

My invention relates to the treatment of zinc ores containing sulphur in or preliminary to their use in the manufacture of zinc oxide for use as a pigment. It has heretofore been customary in treating zinc ores containing a large per cent. of sulphur, such as blende, to subject such ores to a burning or roasting treatment to drive off the sulphur which is utilized in the manufacture of sulphuric acid. A small per cent. of sulphur is, however, left in the ore after the burning or roasting treatment is complete and when the ore is afterward used in the compound reducing the oxidizing furnace where it is treated for the sublimation of the zinc a small percentage of sulphate or sulphite of zinc passes from the furnace together with the zinc oxide and remains in admixture with it very greatly injuring its usefulness and value as a pigment. The same trouble is of course found in treating natural ores containing small percentages of sulphur in the sublimating furnace. I have discovered that the injurious presence of the zinc sulphate or sulphite can be obviated by mixing with the ore an alkali such as basic salts of lime, soda, &c., sufficient in quantity to unite with and so neutralize all the sulphur present and then roasting or heating the mixture to effect a chemical union between the alkali and sulphur; the compounds formed such for instance as a sodium sulphate if a sodium salt be used not being volatile do not pass from the furnace with the oxide of zinc which is thereafter obtained in a pure condition. The alkali may be added to the ore either in the sublimating furnace or during its preliminary treatment; thus for instance it may be added at the close of the burning or roasting treatment for driving off the sulphur; or it may be added to the burned or roasted ore and the mixture heated to effect the union of the alkali and sulphur as an independent step in the process. But preferably I add the alkali to the mixture of ore and coal which is charged into the reducing and oxidizing furnace in which the zinc fumes are driven off.

It will be understood that in referring to the use of an alkali in my new process I intend to include all such salts and compounds as are adapted to neutralize acids; thus besides the alkalies already mentioned I may refer to hydrate of potash, soda ash, magnesium carbonate, sodium nitrate, and other salts which are usually recognized by chemists as similar in their properties.

Having now described my invention, what I claim as new, and desire to secure by Letters Patent, is—

1. The described method of preparing zinc ores containing sulphur for the manufacture of zinc oxide which consists in mixing with the ore an alkali sufficient in quantity to unite with the sulphur present and then roasting the mixture to effect a union of the sulphur and alkali.

2. The described method of preparing zinc ores containing sulphur for the manufacture of oxide of zinc which consists in subjecting the ores to the usual treatment for driving off sulphur then mixing with the ores alkali in quantity sufficient to unite with the sulphur remaining in the ore and roasting the mixture to effect a union of the sulphur and alkali.

3. The described method of treating zinc ores containing sulphur, for the manufacture of oxide of zinc which consists in mixing with the ore alkali sufficient to unite with the sulphur and coal sufficient to effect the sublimation of the zinc charging the mixture into zinc oxide furnaces and igniting it to effect the union of the alkali and sulphur and the sublimation of the zinc.

GEORGE T. LEWIS.

Witnesses:
H. B. RIANHARD,
H. R. SHULZ.